Patented Aug. 7, 1934

1,969,236

UNITED STATES PATENT OFFICE 1,969,236

MANUFACTURE OF BLEACHING POWDER

Heinrich Reitz, Bitterfeld, Germany, assignor, by mesne assignments, to Pen-Chlor, Incorporated, Philadelphia, Pa., a corporation of Delaware No Drawing. Application January 4, 1933, Serial No. 650,161. In Germany November 2, 1931

4 Claims. (Cl. 23—86)

The present invention relates to improvements in the manufacture of bleaching powder.

In the production of bleaching powder according to the ordinary process, by the action of chlorine on hydrate of lime, a condition always occurs sooner or later,—irrespective of the chlorine concentration—namely when a content of about 25 to 34 percent of available chlorine—according to the working conditions—is attained, in which the chlorination product ceases to retain the pulverulent, dustlike character of dry hydrate of lime and undergoes a progressive alteration, at first resembling hydrate of lime that has been charged with moisture. On further chlorination, the chlorination product becomes still more humid, and finally becomes sticky, agglomerating into nodules and lumps having a moist appearance, which set to hard masses on cooling. Bleaching powder produced in this way is accordingly interspersed with lumps and unsightly. The occurrence of this "wet point", which apparently is connected in some way with the accumulation of the water of reaction displaced from combination with the lime by the chlorine, leads to checks in the progress of the chlorination and to difficulties in dehydrating the product, and, in the case of mechanical processes, also produces obstacles in the stirring of the reaction mass.

In order to avoid the foregoing inconveniences in the production of bleaching powder, the present invention performs the chlorination of the hydrate of lime in any convenient apparatus, but only up to a point at which the proportion of available chlorine (usually 30 to 32 percent, or even to 34 percent if the water of reaction be partially removed during the chlorination) is such that the wet point has not yet been reached. The resulting product, which is distinguished by uniformity, from the chemical point of view, and in respect of the finely pulverulent condition, and has a water content of between about 4 and 8 percent (according to the conditions of chlorination) is then dried in known manner, which, owing to its character, can be performed without difficulty, and especially without any substantial increase in the content of chloride chlorine. When dried, the product has a content of about 33 to 34 percent of available chlorine and about 0.5 to 1 percent of chloride chlorine. In order to attain the available chlorine content of 36 to 37 percent expected in commercial bleaching powder, there is then incorporated with the dried low-grade bleaching powder the corresponding quantity of an anhydrous calcium hypochlorite compound, for example neutral calcium hypochlorite containing about 73 to 75 percent of available chlorine. However, it is equally possible to employ a correspondingly larger percentage of any of the known basic calcium hypochlorite compounds for this purpose, provided its available chlorine content amounts to at least about 60 percent.

The mixed product consists of two extremely stable chlorine compounds, and is also highly resistant towards climatic influences, especially in the tropics, owing, by no means least, to its low content of chloride chlorine.

On the other hand, however, given efficient turning over, a content of 30 to 32 percent of available chlorine can be attained, in the chlorination of hydrate of lime, in about half the time required to produce a 36 to 37 percent bleaching powder by the usual process, so that, in addition, a substantial saving of expense is effected in apparatus and labour. In view of the small amounts of high-grade calcium hypochlorite—5 to 6 kgs. of neutral calcium hypochlorite to every 100 kgs. of dried, low-grade bleaching powder—required for the addition, the increased expense incurred in the production of that substance is insignificant.

For special cases—for example, if a saving of freight and cost of packing be an important consideration—the present invention enables bleaching powder to be produced with even more than the commercial content of available chlorine, by adding correspondingly larger amounts of high-grade calcium hypochlorite.

I claim:—

1. A process for the manufacture of bleaching powder, comprising treating hydrate of lime with chlorine gas until a moderate content of available chlorine below that corresponding to the appearance of the wet point is attained, then removing water of reaction from such chlorinated product and finally admixing a quantity of a separately formed calcium hypochlorite compound having a content of available chlorine amounting to at least about 60 percent to such dehydrated product, thereby raising the available chlorine content to at least the level usual in commercial bleaching powder.

2. A process for the manufacture of bleaching powder, comprising treating hydrate of lime with chlorine gas until a moderate content of available chlorine below that corresponding to the appearance of the wet point is attained, then removing water of reaction from such chlorinated product and finally admixing a quantity of neutral calcium hypochlorite having a content of between about 73 and about 75 percent of available chlorine to such dehydrated product, thereby raising the available chlorine content to at least the level usual in commercial bleaching powder.

3. A composition of matter having the properties of high-grade bleaching powder and being particularly resistant to climatic influences, comprising an intimate mixture of a major quantity of low-grade, at least partially dehydrated bleaching powder and a minor quantity of substantially neutral calcium hypochlorite having a content of available chlorine amounting to at least about 60 percent.

4. A composition of matter having the properties of high-grade bleaching powder and being particularly resistant to climatic influences, comprising an intimate mixture consisting of a major quantity of low-grade, at least partially dehydrated bleaching powder and a minor quantity of neutral calcium hypochlorite.

HEINRICH REITZ.